US006749178B1

(12) United States Patent
Loughner

(10) Patent No.: US 6,749,178 B1
(45) Date of Patent: Jun. 15, 2004

(54) LIFT ADAPTER FOR LOG SPLITTER

(76) Inventor: Robert J. Loughner, 1130 Apples Mill Rd., West Newton, PA (US) 15089

( * ) Notice: Subject to any disclaimer, the term of this patent is extended or adjusted under 35 U.S.C. 154(b) by 0 days.

(21) Appl. No.: 10/328,064

(22) Filed: Dec. 26, 2002

(51) Int. Cl.[7] .................................................. B60P 1/00
(52) U.S. Cl. ......................... 254/1; 254/2 R; 144/193.1
(58) Field of Search ........................... 144/195.1, 193.1, 144/195.2; 254/2 R, 2 B, 26, 133, 134

(56) References Cited

U.S. PATENT DOCUMENTS 2,937,002 A * 5/1960 Schultz ..................... 254/93 R
4,061,168 A * 12/1977 Fariss, Jr. ................ 144/193.1
4,354,537 A * 10/1982 Balkus .................... 144/195.5
4,782,870 A * 11/1988 Duerr ...................... 144/195.1
5,535,795 A * 7/1996 Bunn ...................... 144/195.4
5,967,206 A * 10/1999 Milton .................... 144/195.1
6,318,424 B1 * 11/2001 Elfrink .................... 144/195.1

* cited by examiner

*Primary Examiner*—Robert C. Watson
(74) *Attorney, Agent, or Firm*—James Ray & Associates

(57) ABSTRACT

In combination with a portable log splitter having a wheel mounted support frame, a splitter frame mounted on the support frame, a power driven means disposed on the splitter frame for splitting wood, a towing bar engageable with the wheel mounted support frame and a brace disposed on the towing bar, an apparatus is provided for converting the portable log splitter into a hoisting mechanism. The apparatus for converting the log splitter includes a base member removeably attachable to the splitter frame adjacent the bottom thereof for preventing the portable log splitter from tipping over during lifting and a lift adapter that is slidingly engageable with the splitter frame and removeably attachable to the power driven means for engaging a predetermined object to be lifted.

17 Claims, 7 Drawing Sheets

LIFT ADAPTER FOR LOG SPLITTER

FIELD OF THE INVENTION

The present invention relates, in general, to a portable log splitting apparatus, and, more specifically, the present invention relates to an adapter for such log splitter permitting it to be used as a mechanism for lifting.

BACKGROUND OF THE INVENTION

Powered wood splitters are very useful for splitting large quantities of wood for burning in fireplaces or for other sites where it is desirable to have the wood in small sections. There are many different types and forms of wood splitting apparatus.

It is desirable that such powered wood splitter be portable. Further, it is also desirable that such wood splitter have the ability to fold up for storage or be disposed in both a vertical and horizontal position.

The wood splitter should be portable, stable in operation, and one in which storage space for the splitter be minimized. It should be simple in construction and easy to set up and operate. There are several such wood splitters found that meet these criteria. One such splitter is taught in U.S. Pat. No. 4,782,870. The teachings therein are incorporated into this application by reference thereto.

One problem that is associated with equipment such as a wood splitter or other comparable equipment that have only a single specific use is that unless it can be used on a somewhat regular basis it presents a storage problem. It also presents an investment problem because the equipment just sits idle when not in use for that specific application. Thus, it would be advantageous if other uses could be made of equipment such as the wood splitter.

SUMMARY OF THE INVENTION

The present invention provides, in combination with a portable log splitter having a wheel mounted support frame, a splitter frame mounted on the support frame, a power driven means disposed on the splitter frame for splitting wood, a towing bar engageable with the wheel mounted support frame and a brace disposed on the towing bar, a means for converting the portable log splitter into a hoisting mechanism. The means for converting the splitter includes a base member removeably attachable to the splitter frame adjacent the bottom thereof for preventing the portable log splitter from tipping over during lifting and a lift adapter means that is slidingly engageable with the splitter frame and removeably attachable to the power driven means for engaging a predetermined object to be lifted.

OBJECTS OF THE INVENTION

It is, therefore, one of the primary objects of the present invention to provide a means for converting a portable log splitter into a hoisting mechanism.

Another object of the present invention is to provide a means for converting a portable log splitter into a hoisting mechanism in which the conversion is relatively simple.

Yet another object of the present invention is to provide a means for converting a portable log splitter into a hoisting mechanism which is relatively inexpensive.

Still another object of the present invention is to provide a means for converting a portable log splitter into a hoisting mechanism which can be accomplished quickly.

These and various other objects and advantages of this invention will become apparent after a full reading of the following detailed description, particularly, when read in conjunction with the attached drawings as described below and the appended claims.

Figure 1:
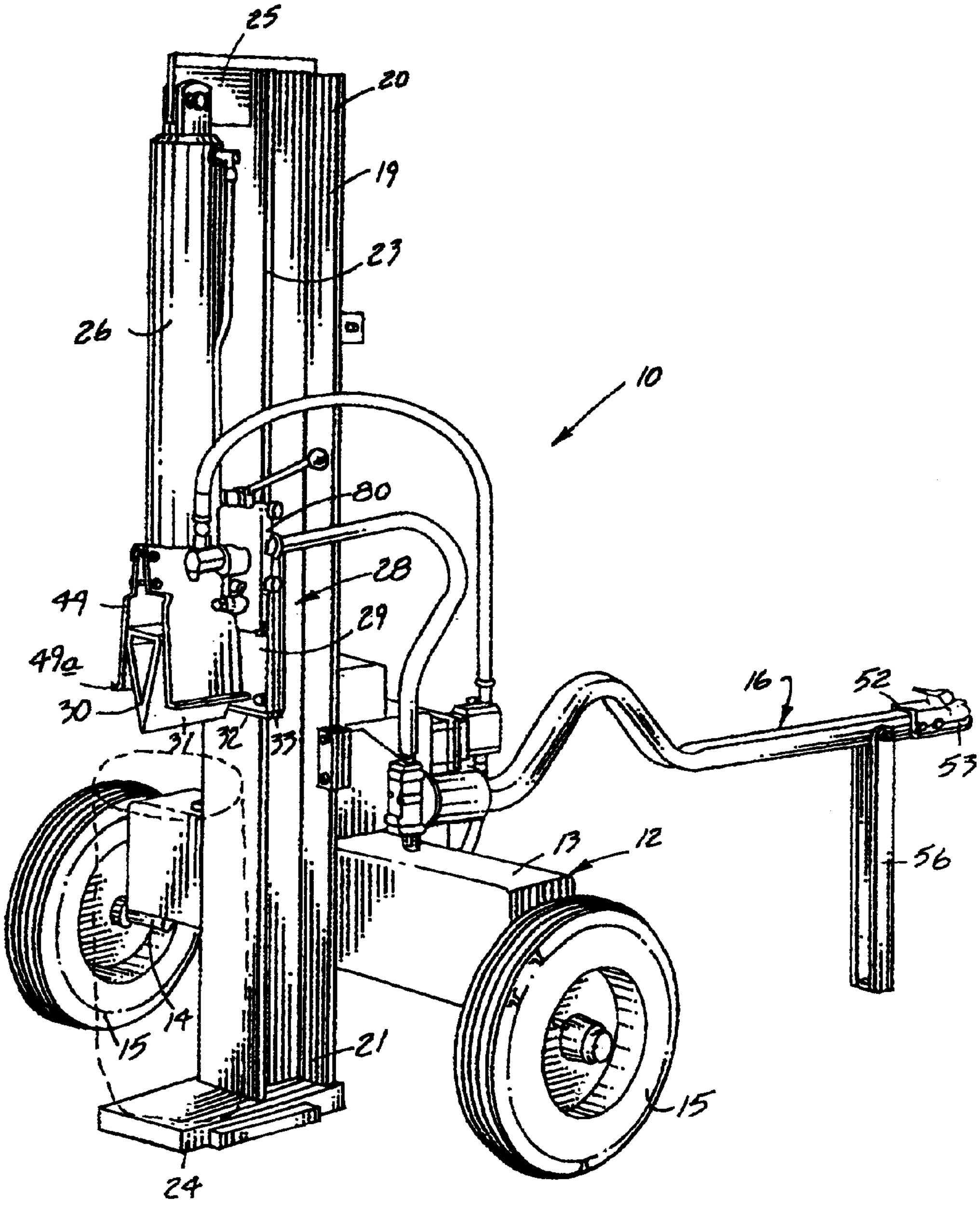
FIG. 1 PRIOR ART
FIG. 1 is a prior art pictorial view of a portable log splitting apparatus having the splitting frame in an upright substantially vertical orientation.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Figure 2:
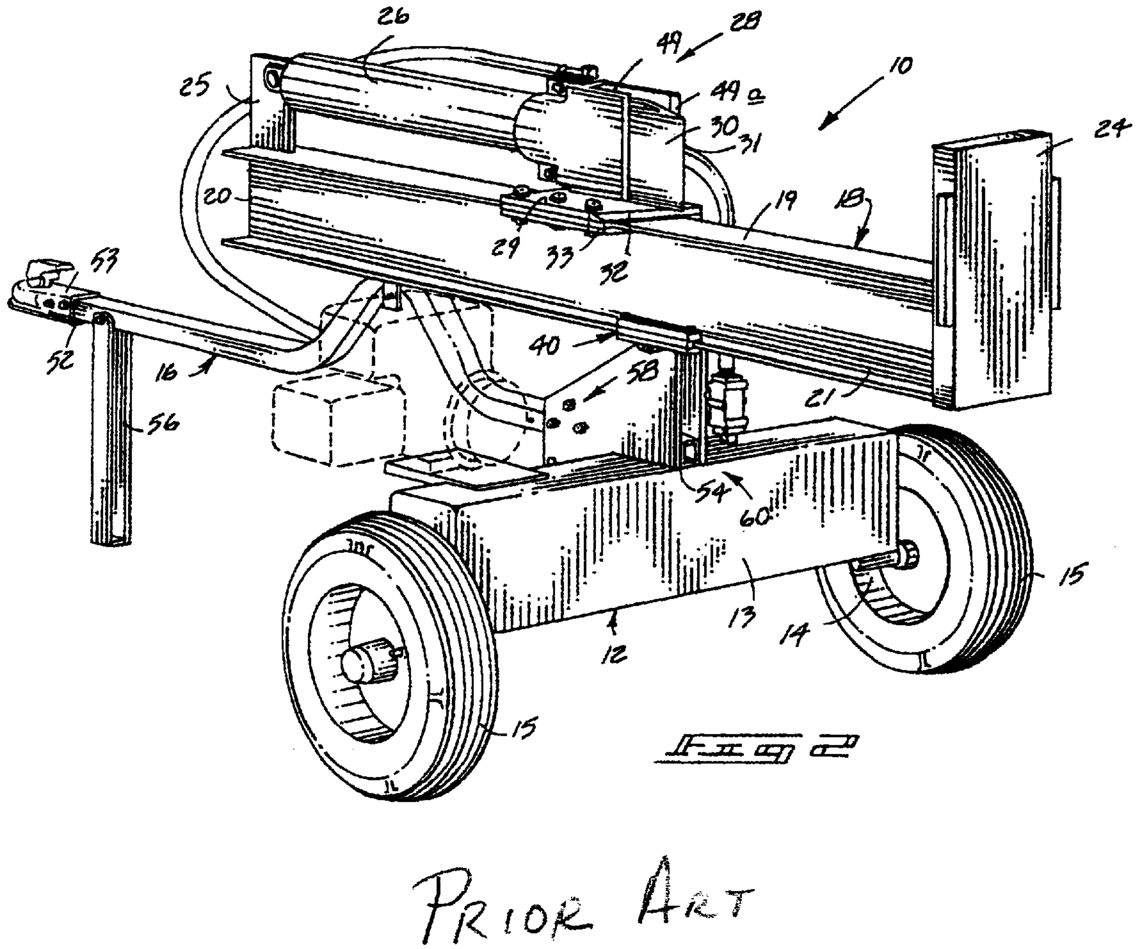
Fig 2 PRIOR ART
FIG. 2 is a prior art pictorial view of a portable log splitting apparatus having the splitting frame in a substantially horizontal orientation.
Figure 3:
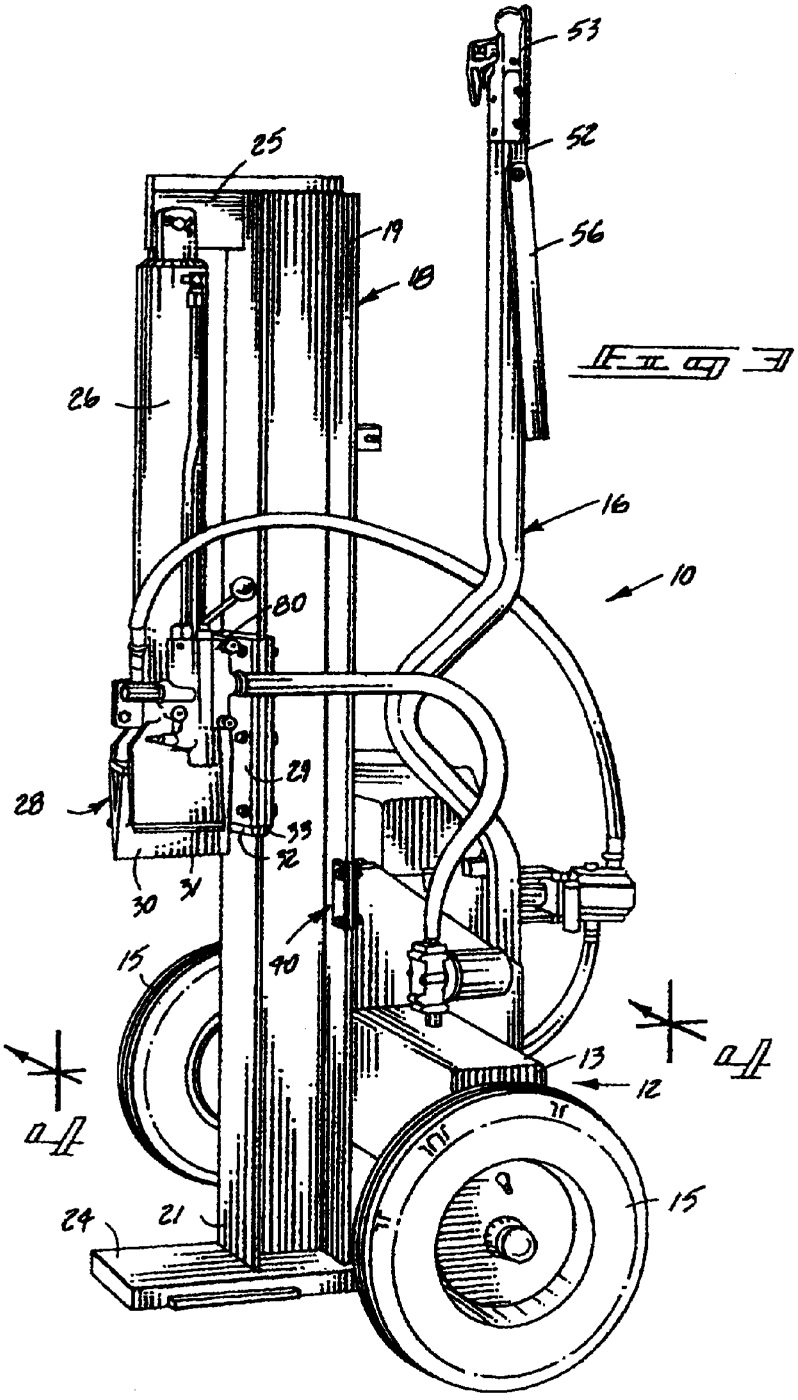
Fig 3 PRIOR ART
FIG. 3 is a prior art pictorial view of a portable log splitting apparatus having the splitting frame in a substantially upright storage position.

Illustrated in FIGS. 1–3 is a prior art log or wood splitter as taught in U.S. Pat. No. 4,782,870. The teachings therein are incorporated into the present application by reference thereto.

Figure 4:
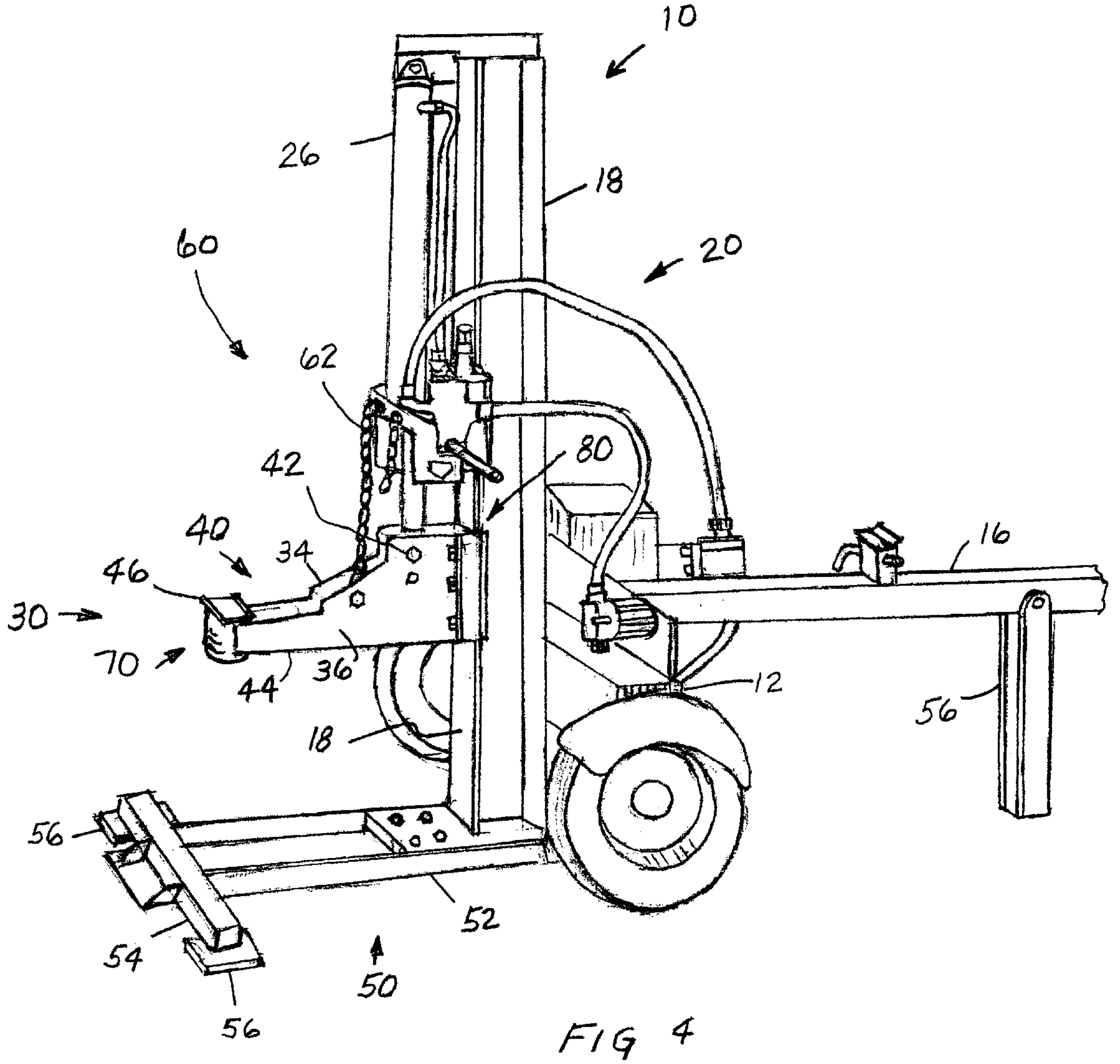
FIG. 4 is a pictorial view of a portable log splitter with a lift adapter and a base member attached according to a presently preferred embodiment of the invention.
Figure 5:
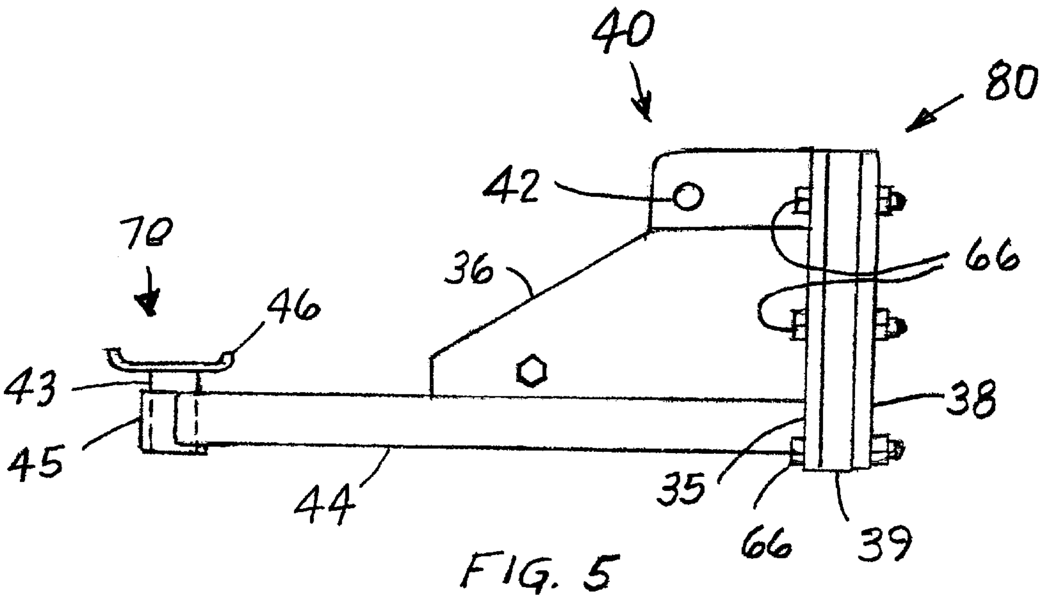
FIG. 5 is a side view of the lift adapter according to an embodiment of the invention shown in FIG. 4.
Figure 6:
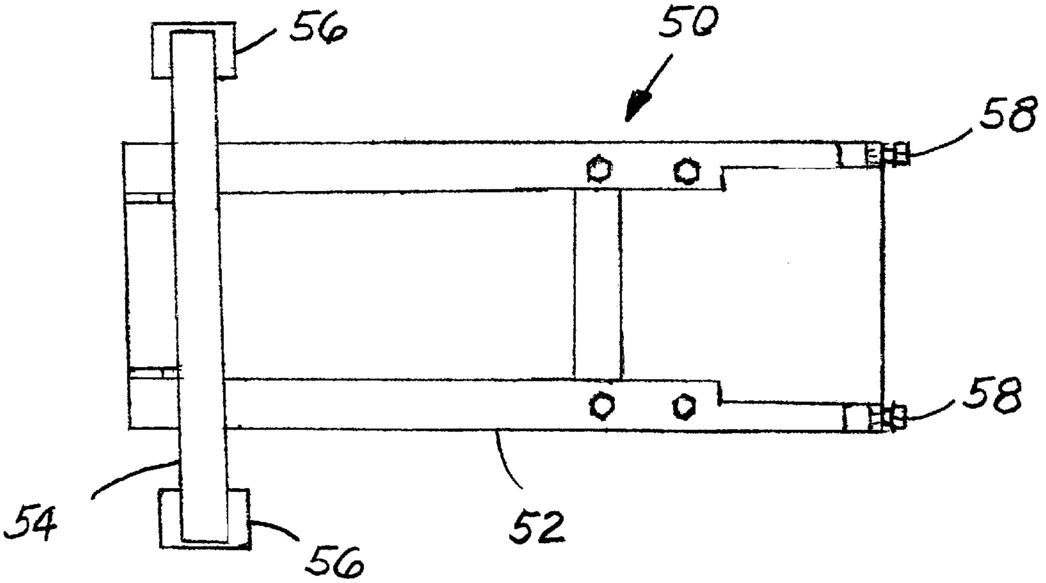
FIG. 6 is a top view of the base member according to an embodiment of the invention shown in FIG. 4.

The present invention as seen in FIG. 4 provides, in combination with a portable log splitter, that is generally designated 10, having a wheel mounted support frame 12, a splitter frame 18 mounted on the support frame 12, a power driven means, generally designated 20, disposed on the splitter frame 12 for splitting wood, a towing bar 16 engageable with the wheel mounted support frame 12 and a brace 56 disposed on the towing bar 16, the improvement comprises a means, that is generally designated 30, for converting the portable log splitter 10 into a hoisting mechanism.

In a presently preferred embodiment of the invention the means 30 includes a lift adapter, generally designated 40. Such lift adapter 40 is engageable with the splitter frame 18 of such wood splitter 10. The lift adapter 40 has a vertical portion, generally designated 80, which replaces splitter head 28 of the portable wood splitter 10 and engages the splitter frame 18 to slideably secure the lift adapter 40 to the splitter frame 18. Such vertical portion 80 includes side plate member 35 (which is comparable to side plate member 29 of the wood splitter 10), flange 38 and spacers 39 along with bolts (and nuts) 66 for securing the parts to the splitter frame 18.

Such lift adapter 40 includes two substantially parallel side wall portions 34,36. The side wall portions 34,36 engage the cylinder portion 26 of such power driven means 20 so as to permit the lift adapter 40 to move up or down as the cylinder 26 moves up or down. Bolt 42 is used to engage the lift adapter 40 to the cylinder portion 26 of the power driven means 20.

The lift adapter 40 has an elongated horizontal portion 44. At the end of horizontal portion 44 is a bracket, generally designated 70. Such bracket 70 is swivably engageable with the horizontal portion 44. By being on a swivel such bracket 70 can rotate so as to simplify engagement with the item to be lifted. Such bracket 70 has a substantially U-shaped portion 46 and a shaft portion 43 which swivably fits into an aperture in the end portion 45 of horizontal portion 44.

The means 30 for converting the wood splitter 10 into a hoisting mechanism further includes a base member, generally designated 50. Such base member 50 engages with the base portion of splitter frame 18 and with the platform portion 24 (shown in the prior art FIG. 1) which forms the base of the splitter frame 18. Base member 50 is needed so as to prevent such wood splitter 10 from tipping over when such wood splitter 10 has been converted to a hoisting mechanism and is used to lift an item. Although the shape of base member 50 is depicted as being substantially rectangular it is within the scope of the invention that such base member could have other shapes such as oval, circular or triangular. However, it is presently preferred that such base member 50 have a substantially rectangular shape.

Figure 7:
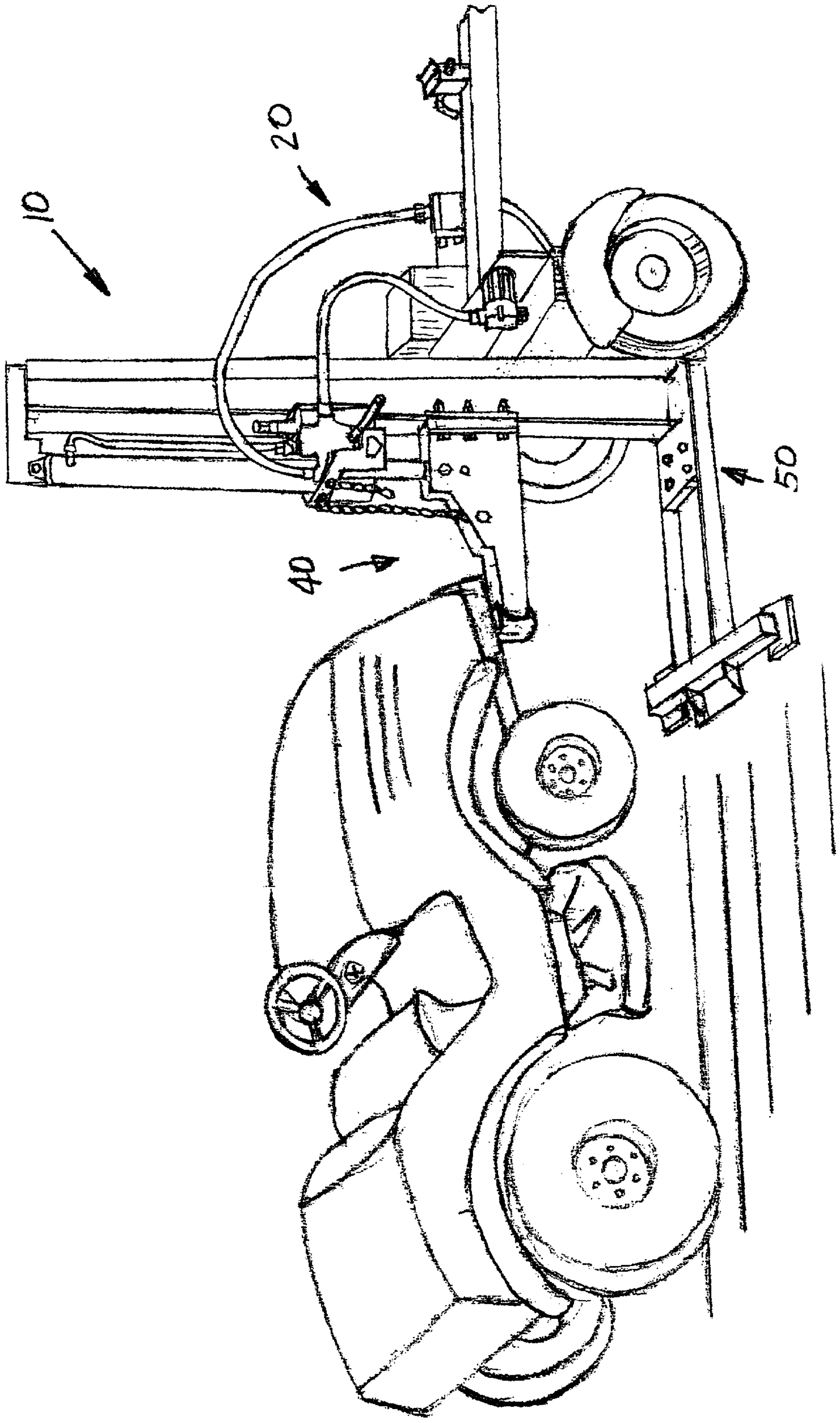
FIG. 7 is a pictorial view of the portable log splitter with a lift adapter and a base member attached according to an embodiment of the invention shown in FIG. 4 displaying an item being lifted.

Such base member 50 includes a relatively flat portion 52 that extends out from the splitter frame 18 on the same side of the splitter frame 18 as such lift adapter 40. At the end of such relatively flat portion 52 of base member 50 there is a cross piece 54 which gives the base member 50 better stability in case the load to be lifted is quite heavy as is pictured in FIG. 7 where a car is shown as the load to be lifted. Such cross member 54 has a foot portion 56 at each end of the cross member 54 which makes contact with the ground to make the unit stable. Such base member 50 is secured to at least one of the base portion of splitter frame 18 and platform 24. It is presently preferred that such base member 50 be secured to the base portion of splitter frame 18 by the use of bolts 58. Such base member 50 can also be secured to the platform 24.

Such lift adapter 40 further includes a securing means generally designated 60 for insuring that the lift adapter 40 will not fall in case there is a loss of power to the unit. Such securing means 60 in a presently preferred embodiment of the invention includes a chain 62 that is engageable with the lift adapter 40 and is also engageable with a part of such power driven means 20.

Figure 8:
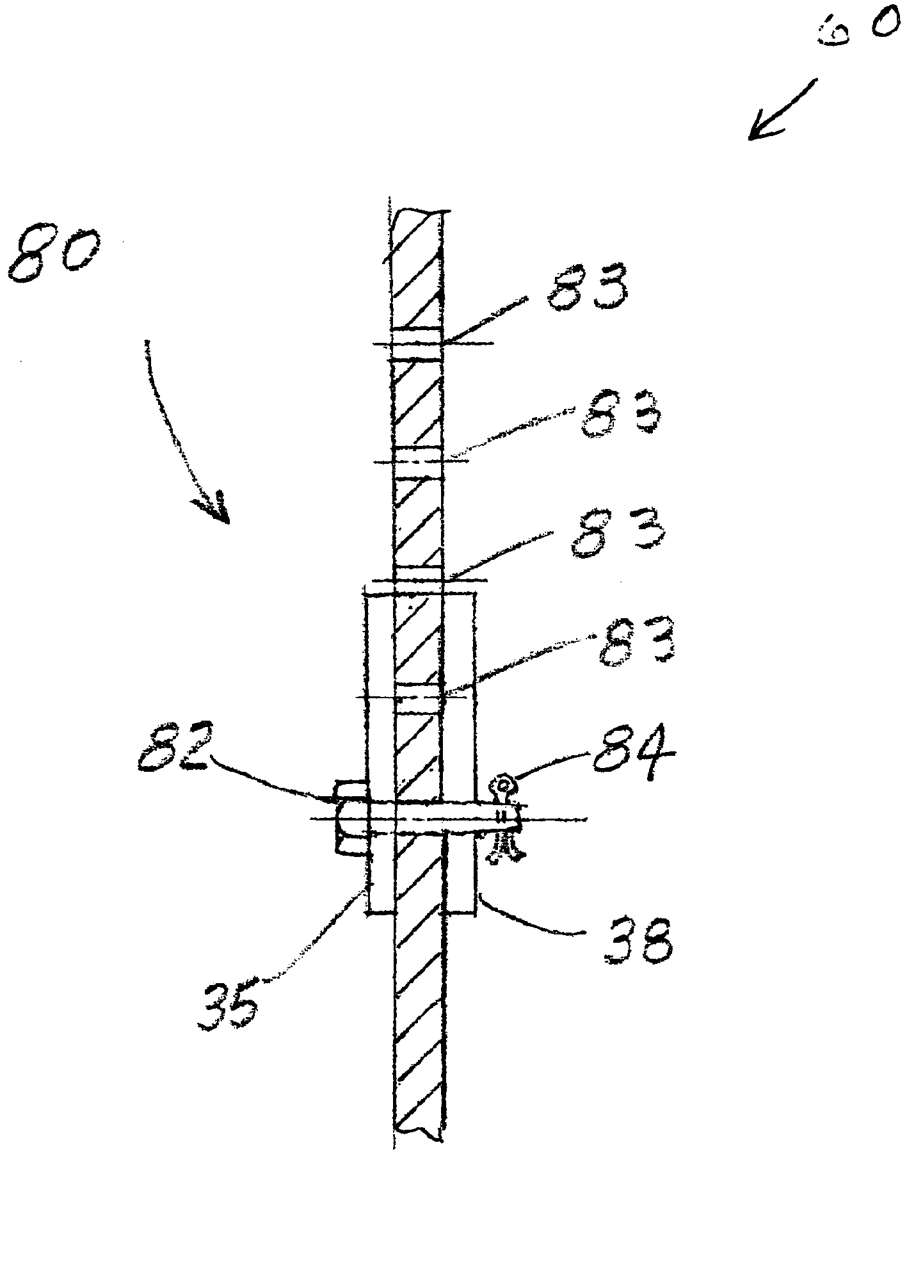
FIG. 8 is a cross sectional view of the securing means according to an alternate embodiment of the invention.

In an alternate embodiment of the invention, as seen in FIG. 8, such securing means 60 includes a plurality of apertures 83 disposed in the face of splitter frame 18. It also includes at least one aperture in the vertical member 80 of lift adapter 40. Such securing means, according to the alternate embodiment, further includes at least one pin member 82 for engagement with such at least one aperture in the vertical member 80 and with at least one aperture in the plurality of apertures 83 in such splitter frame 18. Thus, when the load is lifted the at least one aperture in the vertical member 80 is lined up with one of the apertures 83 in the splitter frame 18 and such pin member 82 is placed through these lined up apertures to secure the lift adapter 40 to the splitter frame 18 in case of a power failure to prevent the load from falling. Such pin member 82 can have a means such as a cotter pin 84 for preventing such pin member 82 from being dislodged.

While both the presently preferred and a number of alternative embodiments of the present invention have been described in detail above it should be understood that various other adaptations and modifications of the present invention can be envisioned by those persons who are skilled in the relevant art without departing from either the spirit of the invention or the scope of the appended claims.

I claim:

1. In combination with a portable log splitter having a wheel mounted support frame, a splitter frame mounted on said support frame, a power driven means disposed on said splitter frame for splitting wood, a towing bar engageable with said wheel mounted support frame and a brace disposed on said towing bar, the improvement comprising a means for converting said portable log splitter into a hoisting mechanism, said means including:

(a) a base member removably attachable to said splitter frame adjacent the bottom thereof for preventing said portable log splitter from tipping over during lifting; and (b) a lift adapter means slidingly engageable with said splitter frame and removably attachable to said power driven means for engaging a predetermined object to be lifted.

2. The combination, according to claim 1, wherein said means for converting further includes a securing means for insuring that said lift adapter member will not fall when used in hoisting an object in the event of a loss of power.

3. The combination, according to claim 2, wherein said securing means includes a chain engageable with said lift adapter member and with said power driven means.

4. The combination, according to claim 1, wherein said power driven means includes a hydraulically driven piston member.

5. The combination, according to claim 4, wherein said lift adapter member is engageable with said hydraulically driven piston member.

6. The combination, according to claim 5, wherein said lift adapter member is engageable with said hydraulically driven piston member by means of a bolt.

7. The combination, according to claim 1, wherein a means is provided between said wheel mounted support frame and said splitter frame for pivotably mounting said splitter frame for movement between a vertical position and a horizontal position.

8. The combination, according to claim 7, wherein said means for pivotably mounting said splitter frame for movement between a vertical position and a horizontal position includes a hinge assembly.

9. The combination, according to claim 1, wherein an adjustment means is provided between said wheel mounted support frame and said towing bar for selectively positioning said towing bar between a substantially horizontal towing position and a substantially upright storage position.

10. The combination, according to claim 2, wherein said securing means includes a plurality of apertures disposed in said splitter frame.

11. The combination, according to claim 10, wherein said securing means includes at least one aperture disposed in said lift adapter.

12. The combination, according to claim 11, wherein said securing means further includes at least one pin member for engagement with said at least one aperture on said lift adapter member and with said plurality of apertures disposed in said splitter frame.

13. The combination, according to claim 1, wherein said lift adapter means further includes a bracket on an outer end of said lift adapter means, said bracket engageable with an item to be lifted.

14. The combination, according to claim 13, wherein said bracket can swivel so as permit engagement with such item to be lifted at various angles.

15. The combination, according to claim 13, wherein said bracket is substantially U shaped.

16. The combination, according to claim 1, wherein said base member is removeably engageable with at least one of said splitter frame and a platform portion of said splitter frame.

17. The combination, according to claim 1, wherein said base member is secured to said at least one of said splitter frame and said a platform portion of said splitter frame by bolts.

* * * * *